United States Patent
Zhou et al.

(10) Patent No.: US 10,572,728 B2
(45) Date of Patent: Feb. 25, 2020

(54) TEXT IMAGE PROCESSING METHOD AND APPARATUS

(71) Applicant: Tencent Technology (Shenzhen) Company Limited, Shenzhen, Guangdong (CN)

(72) Inventors: Longsha Zhou, Guangdong (CN); Hongfa Wang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 188 days.

(21) Appl. No.: 15/802,913

(22) Filed: Nov. 3, 2017

(65) Prior Publication Data
US 2018/0053048 A1    Feb. 22, 2018

Related U.S. Application Data

(63) Continuation of application No. PCT/CN2016/113843, filed on Dec. 30, 2016.

(30) Foreign Application Priority Data

Jan. 5, 2016 (CN) .......................... 2016 1 0004431

(51) Int. Cl.
G06K 9/00 (2006.01)
G06K 9/46 (2006.01)

(52) U.S. Cl.
CPC ....... *G06K 9/00463* (2013.01); *G06K 9/4642* (2013.01); *G06K 2009/4666* (2013.01); *G06K 2209/01* (2013.01)

(58) Field of Classification Search
CPC ............. G06K 9/00463; G06K 9/4647; G06K 9/4642; G06K 9/34; G06K 2009/4666; G06K 2209/01
(Continued)

(56) References Cited

U.S. PATENT DOCUMENTS 5,949,906 A    9/1999 Hontani et al.
2015/0086113 A1    3/2015 Chattopadhyay et al.
(Continued)

FOREIGN PATENT DOCUMENTS

CN    101251892 A    8/2008
CN    101515325 A    8/2009
(Continued)

OTHER PUBLICATIONS

International Search Report for International Application No. PCT/CN2016/113843 dated Apr. 5, 2017 in 15 pages.
(Continued)

*Primary Examiner* — Amandeep Saini
(74) *Attorney, Agent, or Firm* — Knobbe, Martens, Olson & Bear, LLP (57) ABSTRACT

A text image processing method and a text image processing apparatus are provided. In some embodiments, a text image processing method includes: preprocessing a text image to obtain a binary image, where the binary image includes multiple connected regions; acquiring a convex hull corresponding to each of the connected regions with a convex hull algorithm; acquiring a character region circumscribing the convex hull; performing character segmentation on the acquired character region to obtain multiple character blocks; and merging the character blocks based on heights of the character blocks to obtain word blocks of the text image.

12 Claims, 6 Drawing Sheets

- Preprocess a text image to obtain a binary image, the binary image includes multiple connected regions — 210
- Acquire a convex hull corresponding to each of the multiple connected regions with a convex hull algorithm and acquire a character region circumscribing the convex hull — 230
- Perform character segmentation on the acquired character region to obtain multiple character blocks in the binary image — 250
- Merge the character blocks based on heights of the character blocks to obtain word blocks of the text image — 270

(58) Field of Classification Search
USPC .......................................................... 382/182
See application file for complete search history.

(56) References Cited

U.S. PATENT DOCUMENTS

| | | | |
|---|---|---|---|
| 2015/0356740 A1 | 12/2015 | Subbaian et al. | |
| 2018/0089525 A1* | 3/2018 | Yang | .................. G06K 9/346 |

FOREIGN PATENT DOCUMENTS

| | | | |
|---|---|---|---|
| CN | 101751569 A | | 6/2010 |
| CN | 102169542 A | | 8/2011 |
| CN | 102456136 A | | 5/2012 |
| CN | 104951741 A | * | 9/2015 |
| CN | 104951741 A | | 9/2015 |
| CN | 104978576 A | | 10/2015 |
| CN | 105046254 A | * | 11/2015 |
| CN | 105046254 A | | 11/2015 |
| CN | 105117706 A | | 12/2015 |
| CN | 105184289 A | | 12/2015 |
| EP | 0 587 450 A1 | | 3/1994 |
| EP | 2 386 985 A2 | | 11/2011 |
| JP | H01124082 A | | 5/1989 |
| JP | H04098477 A | | 3/1992 |
| JP | H08016719 A | | 1/1996 |

OTHER PUBLICATIONS

Final Office Action with Translation Issued for Japanese Application No. 2017-559607 dated Mar. 4, 2019.
Tanaka et al., "A System for Visually Impaired People to Aquire Merchandise Information". The Institute of Image Information and Television Engineers (ITE) vol. 36 No. 9 dated Feb. 13, 2012.
Chang T-C et al., "Character Segmentation Using Convex-Hull Techniques", International Journal of Pattern Recognition and Artificial Intelligence (IJPRAI), World Scientific Publishing, SI, vol. 13, No. 6, Sep. 1, 1999, pp. 833-858.
Extended European Search Report for Application No. 16883481.0 dated Jul. 25, 2019, in 10 pages.
Office Action with Translation Issued for Chinese Application No. 201610004431.4 dated Jun. 24, 2019, in 17 pages.

* cited by examiner

TEXT IMAGE PROCESSING METHOD AND APPARATUS

The present disclosure is a continuation of International Patent Application No. PCT/CN2016/113843, filed on Dec. 30, 2016, which claims the priority to Chinese Patent Application No. 201610004431.4, titled "TEXT IMAGE PROCESSING METHOD AND APPARATUS", filed on Jan. 5, 2016 with the Chinese State Intellectual Property Office, both of which are incorporated herein by reference in their entireties.

TECHNICAL FIELD

The present disclosure relates to the technical field of character recognition, and in particular to a text image processing method and a text image processing apparatus.

BACKGROUND

In the field of character recognition, character segmentation is an important step in text image processing, and is mainly implemented by performing segmentation on characters at the positions of the characters upon acquiring a text region in an image.

Conventional character segmenting methods include a projection segmenting method, a clustering method, and a template matching method. According to the projection segmenting method, an image is preprocessed to obtain a binary image, and regions where characters locate are determined by means of projection bases on the binary image. According to the clustering method in which a connected region of characters is used, character blocks in the connected region are merged based on a distribution feature of the characters in the whole page. The template matching method is mainly applied to specific fonts or specific characters and is not widely used.

With the above character segmenting methods, characters may be segmented to some extent. However, these methods are usually limited in practical applications. On one hand, in the projection segmenting method, a problem that multiple characters are segmented as a whole may occur in a case that the characters are slanting, while the template matching method may be only applied to specific text environments, resulting in lower availability.

On the other hand, for the clustering method in which the character segmentation is performed based on a connected region, the character segmentation cannot be implemented in a case where a stroke fracture phenomenon or a stroke cohesion phenomenon exist in an acquired character.

Therefore, there are many problems in the above character segmenting methods, and in particular, these methods are limited in practical applications, resulting in low versatility and accuracy.

SUMMARY

Based on the above, a text image processing method and a text image processing apparatus are provided in the present disclosure. According to the method and the apparatus, versatility and accuracy of character segmentation can be improved.

A text image processing method is provided, which includes:

preprocessing a text image to obtain a binary image, where the binary image includes multiple connected regions;

acquiring a convex hull corresponding to each of the multiple connected regions with a convex hull algorithm and acquiring a character region circumscribing the convex hull;

performing character segmentation on the acquired character region to obtain multiple character blocks; and merging the character blocks based on heights of the character blocks to obtain word blocks of the text image.

A text image processing apparatus is provided, which includes:

a preprocessing module configured to preprocess a text image to obtain a binary image, where the binary image includes multiple connected regions;

a convex hull acquiring module configured to acquire a convex hull corresponding to each of the multiple connected regions with a convex hull algorithm and acquire a character region circumscribing the convex hull;

a segmenting module configured to perform character segmentation on the acquired character region to obtain multiple character blocks; and a merging module configured to merge the character blocks based on heights of the character blocks to obtain word blocks of the text image.

It can be seen from the above technical solution that, in text image processing, the binary image and the multiple connected regions in the binary image are first obtained by preprocessing, the convex hull corresponding to each of the multiple connected regions is acquired with the convex hull algorithm and the character region circumscribing the convex hull is acquired, the character segmentation is performed on the character region to obtain the multiple character blocks distributed in the binary image, and the character blocks are merged based on the heights of the character blocks to obtain the word blocks in the text image. In the text imaging processing, the character segmentation is performed and the mergence is performed based on the heights of the character blocks, so that some coherent characters are segmented while preventing characters with an up-down structure in a character row from being segmented, thereby improving the accuracy of the character segmentation. Furthermore, the process is performed based on a character distribution and heights of characters in a text without any limitation in the process, thereby improving the versatility of the character segmentation.

DETAILED DESCRIPTION OF THE EMBODIMENTS

The embodiments embodying the features and advantages of the present disclosure are described in detail in the following description. It should be understood that, the present disclosure is capable of having various changes in various embodiments without departing from the scope of the present disclosure, and the description and illustration are only for illustrating, and should not be interpreted as limiting the present disclosure.

In an application of text recognition adopting the described-above character segmenting method, such as a projection segmenting method, a clustering method and a template matching method, the accuracy of the character segmentation is high only in certain scenarios, while it is low in other scenarios, thereby influencing an accuracy of content recognition in the text recognition application.

A text image processing method and a text image processing apparatus are provided in the present disclosure, to improve versatility and accuracy. The text image processing method may be performed by a processor. The method includes: preprocessing a text image to obtain a binary image, where the binary image includes multiple connected regions; acquiring a convex hull corresponding to each of the multiple connected regions with a convex hull algorithm; acquiring a character region circumscribing the convex hull; performing character segmentation on the acquired character region to obtain multiple character blocks; and merging the character blocks based on heights of the character blocks.

Figure 1:
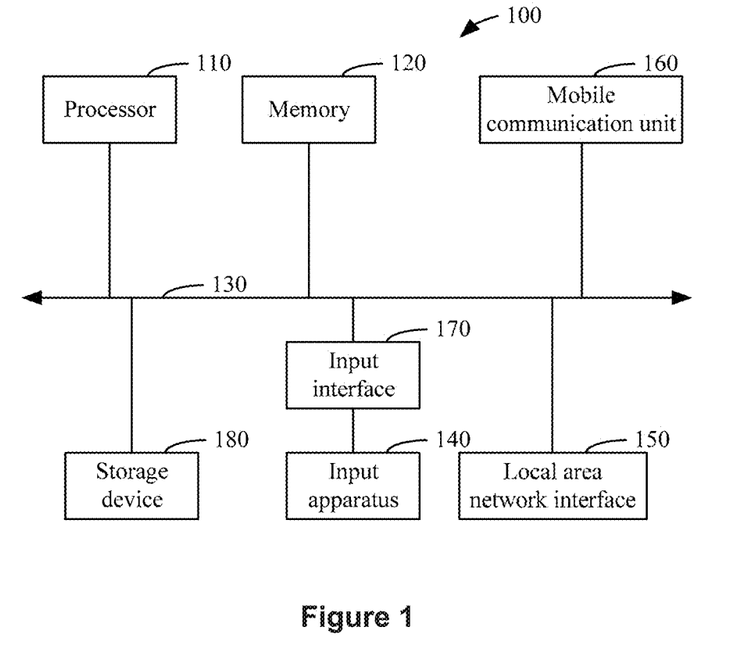
FIG. 1 is a schematic structural diagram of an electronic device according to an embodiment of the present disclosure.

FIG. 1 shows a structure of an electronic device according to an embodiment of the present disclosure. The electronic device 100 is only an example applicable to the present disclosure, and should not be considered as limiting the applicable scope of the present disclosure.

As shown in FIG. 1, the electronic device 100 includes a processor 110, a memory 120 and a system bus 130. Various components including the memory 120 and the processor 110 are connected to the system bus 130. The processor 110 is a hardware device configured to execute computer program instructions by basic arithmetic logic operations in a computer system. The memory 120 is a physical device configured to store computer programs or data temporarily or permanently.

The memory 120 stores the program instructions and multiple text images. The processor 110 executes the program instructions stored in the memory 120 to process the text images.

The electronic device 100 further includes various types of input interfaces 170 and input apparatuses 140, to realize inputs of various operations, the input apparatus 140 may be at least one of a touch screen, a key, a keyboard, a mouse or other input apparatuses.

The electronic device 100 may further include a local area network interface 150 and a mobile communication unit 160 for performing communication functions.

The electronic device 100 further includes a storage device 180, and the storage device 180 may be selected from various computer readable storage media. The computer readable storage media are any available media which can be accessed, including movable storage media and fixed storage media. For example, the computer readable storage media may include but not limited to, a flash memory (such as a micro SD card), a CD-ROM, a digital versatile disk (DVD) or other optical disks, a cassette, a tape storage or other storage devices, or any other media which can store desired information and can be accessed.

The electronic device 100 may perform various operations in the text image processing according to an embodiment of the present disclosure, i.e., performing steps of the text image processing method by executing the program instructions stored in the memory 120 by the processor 110.

Furthermore, the present disclosure may be implemented by hardware circuits or a combination of hardware circuits and software instructions. Therefore, implements of the present disclosure are not limited to any specific hardware circuit, software, or a combination of hardware circuits and software.

Figure 2:
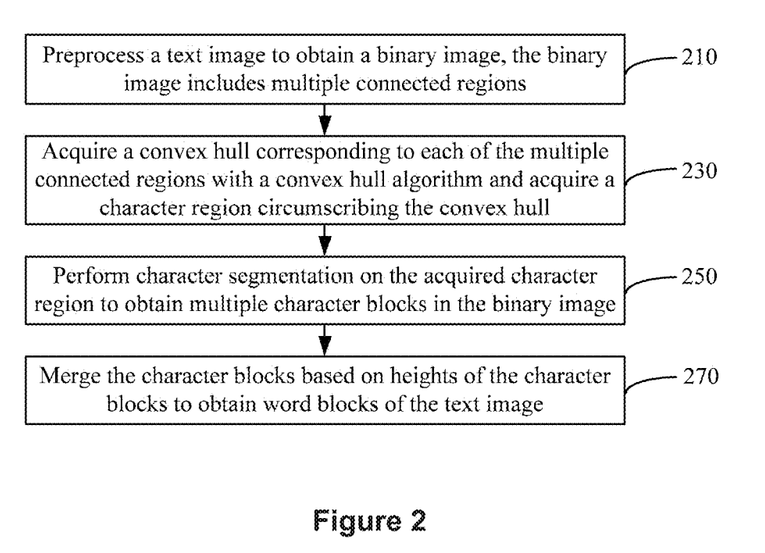
FIG. 2 is a flowchart showing a text image processing method according to an embodiment of the present disclosure.

In an embodiment, the text image processing method is as shown in FIG. 2, which includes steps 210 to 270 as follows.

In step 210, a text image is preprocessed to obtain a binary image, the binary image includes multiple connected regions.

The text image may be any image that includes text content. The text image includes characters constituting the text, and the characters may be arranged in one or more rows. The text image may further include blanks between a character row and other adjacent character rows, and punctuation marks between a character and other adjacent characters. The text image is preprocessed to obtain a binary image which may indicate image information clearly and includes multiple connected regions (also referred to as connected domains). A direction of the character row is hereinafter referred to as a horizontal direction for convenience of description.

The preprocessing includes: performing smoothing filtering on the text image and detecting edges to obtain edges in the text image, and obtaining a distribution region of the characters by means of morphology, thereby obtaining the connected regions of the characters.

In other words, for the multiple connected regions in the binary image, one or more characters exist in each of the multiple connected regions.

In step 230, a convex hull corresponding to each of the multiple connected regions is acquired with a convex hull algorithm and a character region circumscribing the convex hull is acquired.

A convex hull corresponding to each of the connected regions is acquired with the convex hull algorithm, and frame selection is performed based on the convex hull to obtain a character region circumscribing the convex hull. In an optional embodiment, a maximum convex hull corresponding to each of the connected regions is acquired with the convex hull algorithm to prevent information related to characters from being removed, ensuring the integrity of the information related to the characters.

In addition, in an optional embodiment, the character region circumscribing the convex hull is a rectangular region, for example, a rectangular region obtained by performing frame selection on the convex hull with a minimum rectangle, so as to fit an outline of the character, and thereby ensuring the accuracy of the text image processing.

For the multiple convex hulls corresponding to the connected regions, each of the convex hulls corresponds to a character region, and therefore the multiple character regions in the binary image are obtained.

In step 250, character segmentation is performed on the acquired character region to obtain multiple character blocks in the binary image.

The character segmentation in the horizontal direction is performed on each of the multiple character regions in the binary image based on a distribution feature of the characters in the text, to segment characters connected together in each of the character regions. For example, characters which are coherent with each other via a stroke, are separated by the character segmentation in the horizontal direction to obtain the character blocks.

After the character segmentation is performed, multiple character blocks in the binary image are obtained. By the character segmentation in the horizontal direction, character blocks corresponding to a single character are obtained as possible.

In step 270, the character blocks are merged based on heights of the character blocks to obtain word blocks of the text image.

After obtaining the character blocks in the binary image, the character blocks are merged based on the heights of all the character blocks in the binary image, so that the character blocks forming an up-down structure with each other in a same character row are merged.

In a case where a character region is segmented fine enough in the horizontal direction to the most extent, the character blocks that have been segmented into two parts are merged together by merging based on the heights of the character blocks, thereby increasing a subsequent recognition rate.

With the above process, under cooperation between the character segmentation in the horizontal direction and the mergence of the character blocks, each of the character rows in the text image is segmented fine enough to obtain a single character as possible, and then the mergence is performed, so that the character blocks constituting a whole with the up-down structure in a same character row are merged together, thereby facilitating subsequent character recognition.

In the above process, characteristics of the characters are utilized without depending on some other factors. Therefore, versatility of the character segmentation process is improved greatly, and therefore versatility and accuracy of the text recognition application performing the above text image processing method are also improved greatly.

Figure 3:
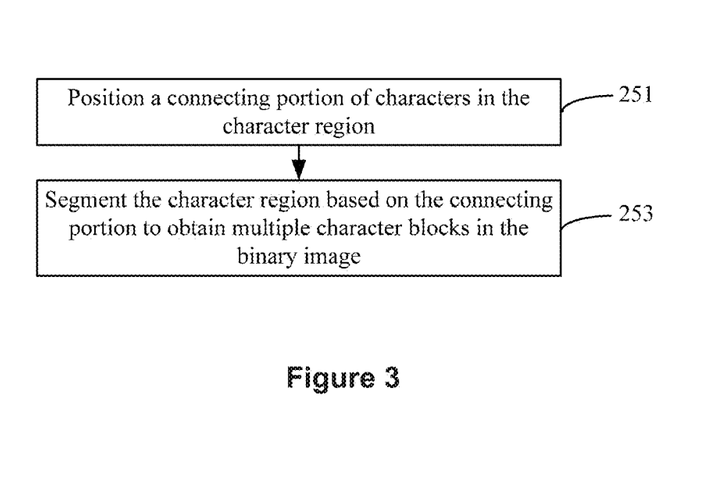
FIG. 3 is a flowchart showing a method for performing character segmentation on a character region to obtain multiple character blocks in a binary image according to an embodiment of the present disclosure.

In an embodiment, step 250 is as shown in FIG. 3, which includes steps 251 and 253 as follows.

In step 251, a connecting portion of characters is positioned in the character region.

The character regions obtained based on the convex hulls in the connected regions are preliminary results obtained by performing frame selection on the characters. Characters coherent with each other usually exist in the character region. According to an embodiment of the present disclosure, the connecting portion of the characters is positioned in a vertical direction to segment the characters in the character region.

If the connecting portion is obtained by positioning in the character region, characters coherent with each other exist in the character region, and it is required to perform segmentation in the horizontal direction in the character region based on the connecting portion.

In step 253, the character region is segmented based on the connecting portion to obtain the multiple character blocks in the binary image.

Specifically, the segmentation performed on the character region based on the connecting portion may be implemented by setting pixel values corresponding to the connecting portion as 0.

The character blocks are obtained by segmenting the character region in the horizontal direction, and correspond to a case where the character region is segmented as fine as possible. On the one hand, the character region is segmented in the horizontal direction based on the connecting portion to obtain at least two character blocks segmented in a character connecting region. On the other hand, for a character region in which no connecting portion exists, the character region is determined as a character block.

Therefore, with the above process, the character region is segmented to obtain multiple character blocks distributed in the binary image, so that the character segmentation is fine enough, and each of the segmented character blocks in each of the character rows corresponds a single character, improving the accuracy of the character segmentation greatly.

Figure 4:
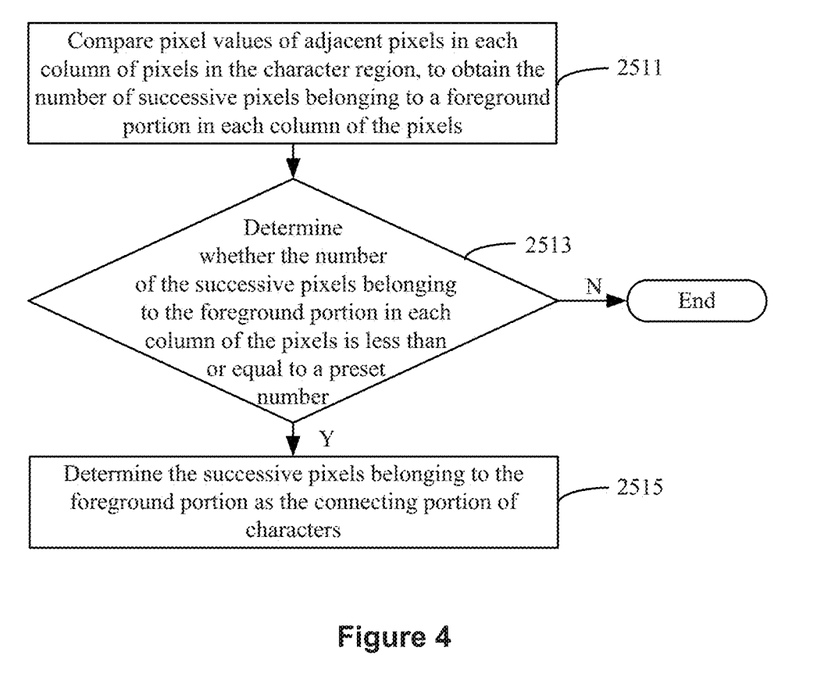
FIG. 4 is a flowchart showing a method for positioning a connecting portions of the characters according to an embodiment of the present disclosure.

Furthermore, in an embodiment, as shown in FIG. 4, step 251 includes steps 2511 to 2515 as follows.

In step 2511, pixel values of adjacent pixels in each column of pixels in the character region are compared to obtain the number of successive pixels belonging to a foreground portion in each column of the pixels.

For the multiple character regions in the binary image, each of the character regions includes multiple pixels. Therefore, the connecting portion is positioned in columns in each of the multiple character regions in the binary image.

In the positioning process, for each column of the pixels in the character region, the successive pixels belonging to the foreground portion in the column of the pixels are acquired by comparing pixel values of the adjacent pixels. The foreground portion is a portion where the pixel value of the pixel is 1, and the successive pixels belonging to the foreground portion in each column of the pixels refers to successive pixels of which the pixel values are 1 in the column of the pixels.

In step 2513, it is determined, for each column of the pixels, whether the number of the successive pixels belonging to the foreground portion is less than or equal to a preset number. If the number of the successive pixels belonging to the foreground portion is less than or equal to the preset number, the process turns to step 2515, otherwise the process ends.

In step 2515, the successive pixels belonging to the foreground portion are determined as the connecting portion of the characters.

In positioning the connecting portions in columns, the preset number is used to recognize the connecting portion, where the preset number may be predetermined according to experiences.

If the number of the successive pixels belonging to the foreground portion in a column of pixels is less than or equal to the preset number (for example, the preset number may be 3), these successive pixels belonging to the foreground portion are determined as the connecting portion of the characters.

Specifically, in positioning the connecting portions, for the multiple character regions in the binary image, heights and widths (expressed by the number of pixels) of the character regions are first calculated. In an embodiment, heights and widths of rectangular regions are calculated. Hereinafter, description is made with a width rect_width and a height rect_hight, where i and j are defined as $1 \leq i \leq \text{rect\_width}$ and $1 \leq j \leq \text{rect\_hight}$.

For any one of the character regions, i is initialized as i=1, and pixels in an i-th column are extracted to obtain pixel values image (i, $1 \leq j \leq \text{rect\_hight}$) of the pixels in the i-th column.

Among the pixels in the i-th column, a pixel value of a pixel image (i,j) is compared with a pixel value of a pixel image (i,j+1). If the pixel value changes from 0 to 1 or changes from 1 to 1, a value corresponding to line_num_1 representing the number of the pixels in a column of which the pixel values are 1, is increased, i.e., line_num_1=line_num_1+1.

Therefore, a value corresponding to line_num_1 of the pixels in the i-th column is obtained, and the value is the number of successive pixels belonging to the foreground portion in the i-th column of the pixels.

It is determined whether the value corresponding to line_num_1 is less than or equal to a preset number m. If the value corresponding to line_num_1 is less than or equal to the preset number m, these successive pixels are determined as the connecting portion of the characters. In this case, the segmentation may be implemented by setting pixel values of the pixels in a current column as 0.

After comparison and determination on the i-th column of the pixels is completed, the comparison and the determination are performed on the (i+1)-th column of the pixels, and so forth until the connecting portions in the whole character region are positioned in the horizontal direction in case that i=rect_width.

Figure 5:
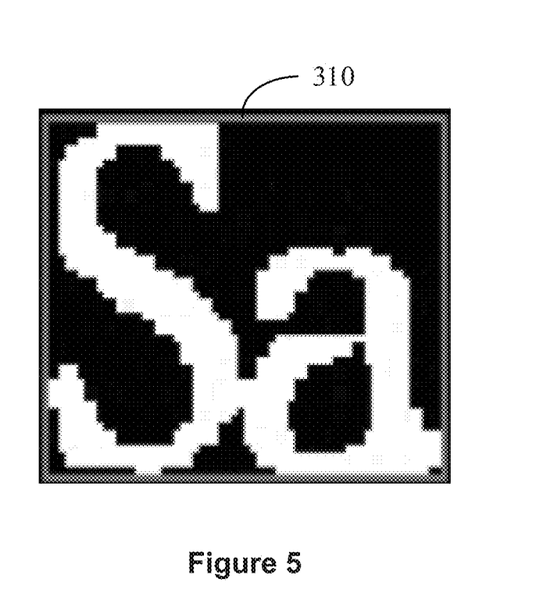
FIG. 5 is a schematic diagram of a character region including two characters according to an embodiment of the present disclosure.
Figure 6:
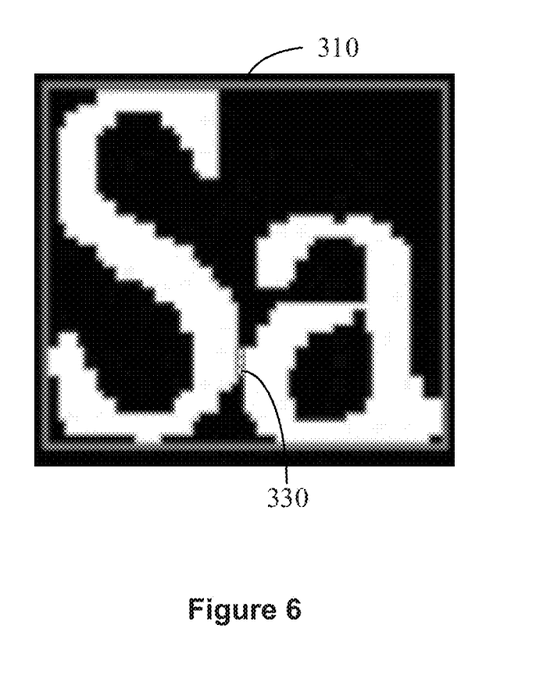
FIG. 6 is a schematic diagram of a connecting portion obtained by positioning in the character region in FIG. 5.

For example, as shown in FIG. 5, for a character region 310 including two characters "S" and "a", a connecting portion 330 in the character region 310, as shown in FIG. 6, is obtained by positioning the connecting portion on the character region 310, i.e., obtaining three successive pixels in the vertical direction (the three successive pixels are in a same column), and pixel values corresponding to the three successive pixels are 1.

Figure 7:
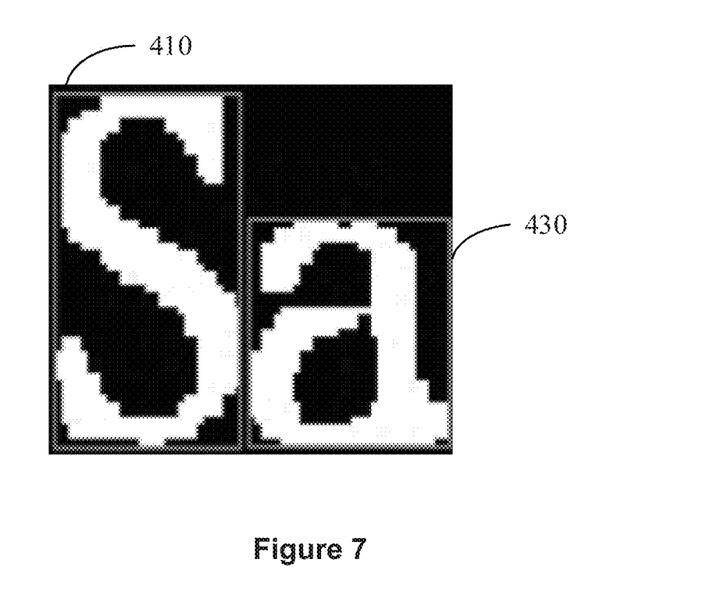
FIG. 7 is a schematic diagram of character blocks obtained by segmenting the character region in FIG. 5.

Two character blocks, as shown in FIG. 7, are obtained by segmenting the character region based on the connecting portion, i.e., a character block 410 where the character "S" locates and a character block 430 where the character "a" locates.

Figure 8:
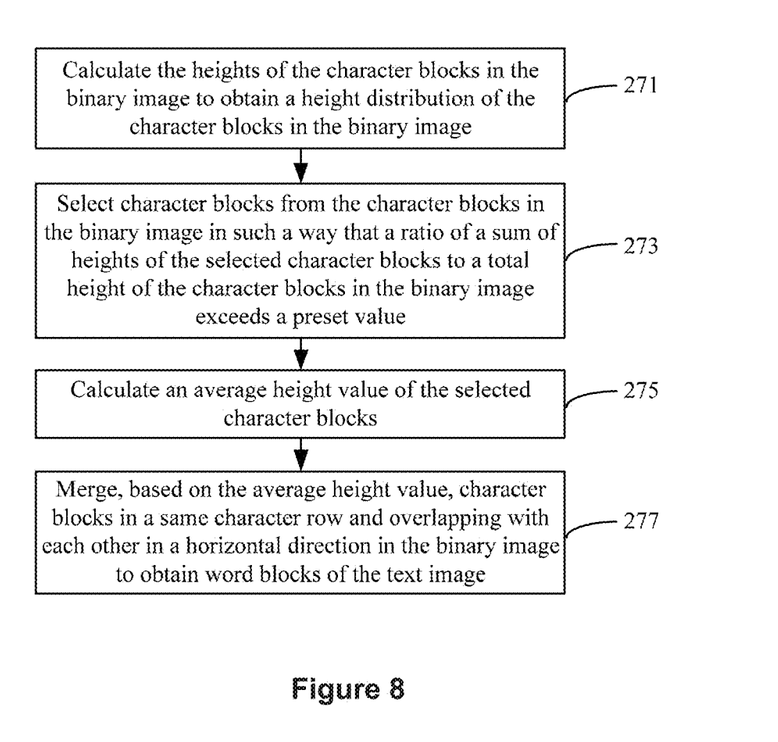
FIG. 8 is a flowchart showing a method for merging character blocks based on heights of the character blocks to obtain word blocks of a text image according to an embodiment of the present disclosure.

In an embodiment, as shown in FIG. 8, step 270 includes steps 271 to 277 as follows.

In step 271, heights of the character blocks in the binary image are calculated to obtain a height distribution of the character blocks in the binary image.

Optionally, in step 271, a total height of the character blocks in the binary image, i.e., a sum of the heights of all the character blocks in the binary image, is further calculated.

As described above, the binary image contains multiple character blocks. For any one of the character blocks, the height thereof is calculated to obtain the height corresponding to each of the character blocks in the binary image. Furthermore, the height distribution of the character blocks in the binary image is obtained by performing statistical processing on the number of the character blocks having a same height in the binary image.

Specifically, the statistical processing is performed on the heights of all the character blocks in the binary image, character blocks having a same height are grouped together, and the number of the character blocks in each group is counted. For example, the height of the character blocks in each group in the binary image is represented by an array static_height[n], and correspondingly the number of the character blocks corresponding to each height is stored in an array num_rect[n], where $1 \leq n$.

In step 273, it is determined, based on the obtained height distribution of the character blocks in the binary image, a ratio of a sum of heights of which character blocks to the total height of the character blocks in the binary image exceeds a preset value.

In other words, target character blocks are selected from the character blocks in the binary image, a ratio of a sum of heights of the target character blocks to the total height of the character blocks in the binary image exceeds the preset value.

For example, some groups are determined in such a way that a ratio of a sum of heights of character blocks in the groups to the sum of the heights of all the character blocks in the binary image is greater than the preset value. The preset value may be a value greater than 50%, such as 80%.

Specifically, the array static_height[n] may be first ranked in an order from the largest num_rect[n] or from the smallest num_rect[n], to obtain an array static_height[n] ranked in a descending order or an ascending order of num_rect[n].

The sum of the heights sum_height is acquired by calculating based on the heights of the character blocks in the binary image and the number of the character blocks.

First k Heights of character blocks are extracted in the above order, for example, the extracted heights of the character blocks are static_height[1], . . . , static_height[k] which make the following expression true for the first time, $$(\text{num\_rect}[1]*\text{static\_height}[1]+\text{num\_rect}[2]*\text{static\_height}[2]+ \ldots +\text{num\_rect}[k]*\text{static\_height}[k])/\text{sum\_height} \geq 0.8.$$

In step 275, an average height value of the target character blocks is calculated.

In this step, the average height value is calculated based on the character blocks selected in step 273 and the sum of the heights of these character blocks.

The average value of the obtained heights static_height[1], . . . , static_height[k] is calculated to obtain the average height value height_avg, that is, $$(\text{num\_rect}[1]*\text{static\_height}[1]+\text{num\_rect}[2]*\text{static\_height}[2]+ \ldots +\text{num\_rect}[k]*\text{static\_height}[k])/k=\text{height\_avg}.$$

In step 277, character blocks in a same character row and overlapping with each other in the horizontal direction are merged in the binary image based on the average height value to obtain the word blocks of the text image.

The average height value is calculated. For any character row in the binary image, if a sum of heights of two character blocks is less than the average height value and the two character blocks overlap with each other in the horizontal direction, the two character blocks are merged.

In other words, the following two conditions need to be met in the mergence process of the character blocks in the binary image, that is, $$|\text{middle\_rect\_}x(i)-\text{middle\_rect\_}x(k)|-(\text{middle\_rect\_width}(i)+\text{middle\_rect\_width}(k))/2<0; \quad \text{condition 1,}$$

and $$\text{rect\_height}(i) + \text{rect\_height}(k) \leq \text{height\_avg}, \qquad \text{condition 2,}$$

where 1≤i≤m, m represents the number of character blocks, middle_rect_x(i) represents a coordinate of a center of an i-th character block on x-axis, middle_rect_width(i) represents a width of the i-th character block, and rect_height(i) represents a height of the i-th character block.

The i-th character block is compared with the remaining character blocks. If a sum of the heights of a k-th character block and the current i-th character block is less than the average height value, and the k-th character block and the i-th character block overlap with each other in the horizontal direction, the above two conditions are met.

Therefore, it is considered that the two character blocks should be merged.

With the above process, the character blocks with the up-down structure and having a sum of the heights thereof less than the average height value are well merged, ensuring a distribution of the character blocks in the horizontal direction, so that the character blocks in the horizontal direction can be well combined and recognized in the subsequent recognition process.

In an embodiment, the method described above further includes: recognizing the text image including the word blocks. In recognizing the text image, the word blocks are combined based on a sequence of the word blocks, to obtain the text content of the text image.

In the process, strategies are set based on requirements to process the word blocks in a recognition algorithm. For example, selective mergence is performed on the word blocks, where the selective mergence refers to merging some adjacent blocks which are too narrow, or performing finer segmentation on some word blocks which are too wide, based on an average width and an average height of blocks in a character row.

It should be noted that, the adopted recognition algorithm may be a recognition algorithm in which the extraction is based on a character feature, such as a gradient feature of a gray level image and a HOG feature of the characters.

Figure 9:
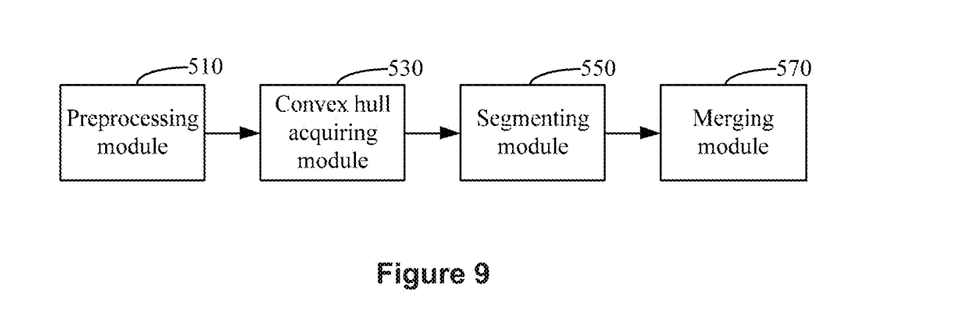
FIG. 9 is a schematic structural diagram of a text image processing apparatus according to an embodiment of the present disclosure.

In an embodiment, a text image processing apparatus is provided. As shown in FIG. 9, the text image processing apparatus includes a preprocessing module 510, a convex hull acquiring module 530, a segmenting module 550 and a merging module 570.

The preprocessing module 510 is configured to preprocess a text image to obtain a binary image, where the binary image includes multiple connected regions.

The convex hull acquiring module 530 is configured to acquire a convex hull corresponding to each of the multiple connected regions with a convex hull algorithm and acquire a character region circumscribing the convex hull.

The segmenting module 550 is configured to perform character segmentation on the acquired character region to obtain multiple character blocks in the binary image.

The merging module 570 is configured to merge the character blocks based on heights of the character blocks to obtain word blocks of the text image.

Figure 10:
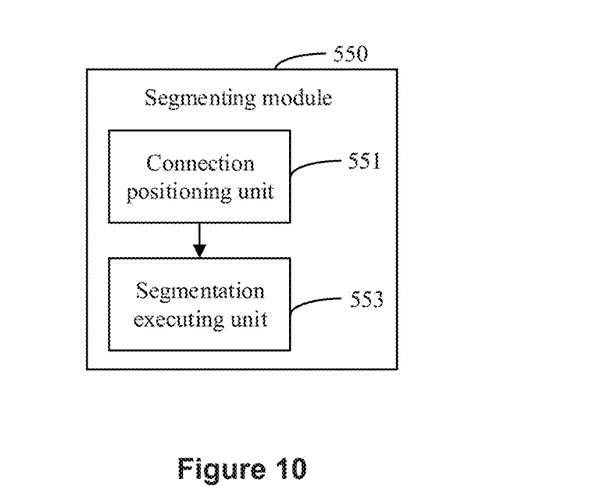
FIG. 10 is a schematic structural diagram of a segmenting module according to an embodiment of the present disclosure.

In an embodiment, as shown in FIG. 10, the segmenting module 550 includes a connection positioning unit 551 and a segmentation executing unit 553.

The connection positioning unit 551 is configured to position a connecting portion of characters in the character region.

The segmentation executing unit 553 is configured to segment the character region based on the connecting portion to obtain the multiple character blocks in the binary image.

Figure 11:
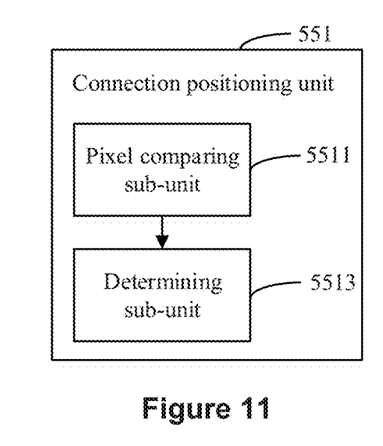
FIG. 11 is a schematic structural diagram of a connection positioning unit according to an embodiment of the present disclosure.

In an embodiment, as shown in FIG. 11, the connection positioning unit 551 includes a pixel comparing sub-unit 5511 and a determining sub-unit 5513.

The pixel comparing sub-unit 5511 is configured to compare pixel values of adjacent pixels in each column of pixels in the character region, to obtain the number of successive pixels belonging to a foreground portion in each column of the pixels.

The determining sub-unit 5513 is configured to determine whether the number of the successive pixels belonging to the foreground portion in each column of the pixels is less than or equal to a preset number, and determine the successive pixels belonging to the foreground portion in a column of the pixels as the connecting portion of characters in a case that the number of the successive pixels belonging to the foreground portion in the column of the pixels is less than or equal to the preset number.

Figure 12:
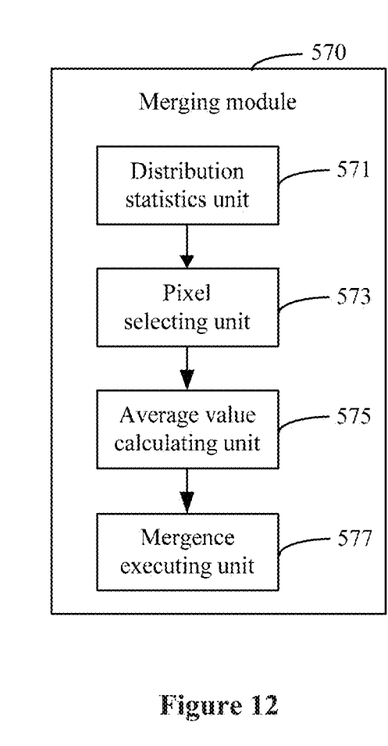
FIG. 12 is a schematic structural diagram of a merging module according to an embodiment of the present disclosure.

In an embodiment, as shown in FIG. 12, the merging module 570 includes a distribution statistics unit 571, a pixel selecting unit 573, an average value calculating unit 575 and a mergence executing unit 577.

The distribution statistics unit 571 is configured to calculate the heights of the character blocks in the binary image to obtain a height distribution of the character blocks in the binary image. Optionally, the distribution statistics unit 571 is further configured to calculate a total height of the character blocks, i.e., a sum of the heights of all the character blocks in the binary image.

The pixel selecting unit 573 is configured to determine, based on the obtained height distribution of the character blocks in the binary image, a ratio of a sum of heights of which character blocks to the total height of the character blocks in the binary image exceeds a predetermined value. In other words, the pixel selecting unit 573 is configured to select target character blocks from the character blocks, where a ratio of a sum of heights of the target character blocks to the total height of the character blocks exceeds a preset value.

The average value calculating unit 575 is configured to calculate an average height value of the target character blocks.

The mergence executing unit 577 is configured to merge, based on the average height value, character blocks in a same character row and overlapping with each other in a horizontal direction in the binary image to obtain word blocks of the text image.

In an embodiment, the apparatus described above further includes a recognizing module. The recognizing module is configured to recognize the text image including word blocks. In recognizing the text image, the word blocks are combined based on a sequence of the word blocks, to obtain the text content of the text image.

It can be understood by those skilled in the art that all or some of steps in the above embodiments may be implemented by hardware or may be implemented by instructing hardware with a program. The program may be stored in a computer readable storage media, which may be a read-only memory, a magnet disk or an optical disk.

Although the present disclosure is described with reference to some embodiments, it should be understood that, terms used herein are illustrative, but not limiting. Because the present disclosure may be implemented in various manner without departing from the spirit and the essence of the present disclosure, it should be understood that, the above embodiments are not limited to any detail described above, and should be widely explained within the spirit and the scope defined by the appended claims. Therefore, all the changes and modifications falling within the scope of the claims or the equivalents should be encompassed by the appended claims.

The invention claimed is:

1. A text image processing method, comprising:
preprocessing a text image to obtain a binary image, wherein the binary image comprises a plurality of connected regions;
acquiring a convex hull corresponding to each of the plurality of the connected regions with a convex hull algorithm;
acquiring a character region circumscribing the convex hull;
performing character segmentation on the acquired character region to obtain a plurality of character blocks; and
merging the character blocks based on heights of the character blocks to obtain word blocks of the text image,
wherein the method is performed by a processor,
wherein the merging the character blocks based on heights of the character blocks comprises:
calculating the heights of the character blocks to obtain a height distribution of the character blocks and a total height of the character blocks;
selecting target character blocks from the character blocks, wherein a ratio of a sum of heights of the target character blocks to the total height of the character blocks exceeds a preset value;
calculating an average height value of the target character blocks; and
merging, based on the average height value, character blocks in a same character row and overlapping with each other in a horizontal direction in the binary image.

2. The method according to claim 1, wherein the performing character segmentation on the acquired character region to obtain a plurality of character blocks comprises:
positioning a connecting portion of characters in the character region; and
segmenting the character region based on the connecting portion to obtain the plurality of the character blocks.

3. The method according to claim 2, wherein the positioning a connecting portion of characters in the character region comprises:
comparing pixel values of adjacent pixels in each column of pixels in the character region, to obtain the number of successive pixels belonging to a foreground portion in each column of the pixels; and
determining whether the number of the successive pixels belonging to the foreground portion in each column of the pixels is less than or equal to a preset number, and determining the successive pixels belonging to the foreground portion in a column of the pixels as the connecting portion of characters in a case that the number of the successive pixels belonging to the foreground portion in the column of the pixels is less than or equal to the preset number.

4. The method according to claim 1, further comprising:
combining the word blocks based on a sequence of the word blocks in the text image to obtain text content of the text image.

5. A text image processing apparatus, comprising a processor and a memory storing program instructions, wherein the processor is configured to execute the program instructions to:
preprocess a text image to obtain a binary image, wherein the binary image comprises a plurality of connected regions;
acquire a convex hull corresponding to each of the plurality of the connected regions with a convex hull algorithm and acquire a character region circumscribing the convex hull;
perform character segmentation on the acquired character region to obtain a plurality of character blocks; and
merge the character blocks based on heights of the character blocks to obtain word blocks of the text image,
wherein the processor is further configured to execute the program instructions to:
calculate the heights of the character blocks to obtain a height distribution of the character blocks and a total height of the character blocks;
select target character blocks from the character blocks, wherein a ratio of a sum of heights of the target character blocks to the total height of the character blocks exceeds a preset value;
calculate an average height value of the target character blocks; and
merge, based on the average height value, character blocks in a same character row and overlapping with each other in a horizontal direction in the binary image.

6. The apparatus according to claim 5, wherein the processor is further configured to execute the program instructions to:
position a connecting portion of characters in the character region; and
segment the character region based on the connecting portion to obtain the plurality of the character blocks.

7. The apparatus according to claim 6, wherein the processor is further configured to execute the program instructions to:
compare pixel values of adjacent pixels in each column of pixels in the character region, to obtain the number of successive pixels belonging to a foreground portion in each column of the pixels; and
determine whether the number of the successive pixels belonging to the foreground portion in each column of the pixels is less than or equal to a preset number, and determine the successive pixels belonging to the foreground portion in a column of the pixels as the connecting portion of characters in a case that the number of the successive pixels belonging to the foreground portion in the column of the pixels is less than or equal to the preset number.

8. The apparatus according to claim 5, wherein the processor is further configured to execute the program instructions to:
combine the word blocks based on a sequence of the word blocks in the text image to obtain text content of the text image.

9. A non-transitory computer readable storage medium comprising program instructions that, when executed by a processor of a calculation apparatus, cause the apparatus to perform a text image processing method, wherein the text image processing method comprises:
preprocessing a text image to obtain a binary image, wherein the binary image comprises a plurality of connected regions;

acquiring a convex hull corresponding to each of the plurality of the connected regions with a convex hull algorithm;

acquiring a character region circumscribing the convex hull;

performing character segmentation on the acquired character region to obtain a plurality of character blocks; and merging the character blocks based on heights of the character blocks to obtain word blocks of the text image, wherein the merging the character blocks based on heights of the character blocks comprises:

calculating the heights of the character blocks to obtain a height distribution of the character blocks and a total height of the character blocks;

selecting target character blocks from the character blocks, wherein a ratio of a sum of heights of the target character blocks to the total height of the character blocks exceeds a preset value;

calculating an average height value of the target character blocks; and merging, based on the average height value, character blocks in a same character row and overlapping with each other in a horizontal direction in the binary image.

10. The non-transitory computer readable storage medium according to claim 9, wherein the performing character segmentation on the acquired character region to obtain a plurality of character blocks comprises:

positioning a connecting portion of characters in the character region; and segmenting the character region based on the connecting portion to obtain the plurality of the character blocks.

11. The non-transitory computer readable storage medium according to claim 10, wherein the positioning a connecting portion of characters in the character region comprises:

comparing pixel values of adjacent pixels in each column of pixels in the character region, to obtain the number of successive pixels belonging to a foreground portion in each column of the pixels; and determining whether the number of the successive pixels belonging to the foreground portion in each column of the pixels is less than or equal to a preset number, and determining the successive pixels belonging to the foreground portion in a column of the pixels as the connecting portion of characters in a case that the number of the successive pixels belonging to the foreground portion in the column of the pixels is less than or equal to the preset number.

12. The non-transitory computer readable storage medium according to claim 9, wherein the text image processing method further comprises:

combining the word blocks based on a sequence of the word blocks in the text image to obtain text content of the text image.

* * * * *